United States Patent [19]

Cheney, Jr.

[11] 4,352,629

[45] Oct. 5, 1982

[54] WIND TURBINE

[75] Inventor: Marvin C. Cheney, Jr., Glastonbury, Conn.

[73] Assignee: United Technologies Corporation, Hartford, Conn.

[21] Appl. No.: 312,604

[22] Filed: Oct. 19, 1981

[51] Int. Cl.³ .............................................. F03D 7/04
[52] U.S. Cl. ................................... 416/18; 416/132 B; 416/139; 416/141
[58] Field of Search ................. 416/132 B, 139 A, 11, 416/41 A, 18

[56] References Cited

U.S. PATENT DOCUMENTS

| | | | |
|---|---|---|---|
| 4,003,676 | 1/1977 | Sweeney et al. | 416/41 A X |
| 4,006,925 | 2/1977 | Scherer | 416/41 A X |
| 4,025,230 | 5/1977 | Kastan | 416/18 |
| 4,083,651 | 4/1978 | Cheney et al. | 416/18 |
| 4,084,921 | 4/1978 | Norz | 416/17 |
| 4,111,601 | 9/1978 | Richard | 416/41 A |
| 4,201,514 | 5/1980 | Huetter | 416/37 |

Primary Examiner—Everette A. Powell, Jr.
Attorney, Agent, or Firm—John Swiatocha

[57] ABSTRACT

A wind turbine of the type having an airfoil blade (15) mounted on a flexible beam (20) and a pitch governor (55) which selectively, torsionally twists the flexible beam in response to wind turbine speed thereby setting blade pitch, is provided with a limiter (85) which restricts unwanted pitch change at operating speeds due to torsional creep of the flexible beam. The limiter allows twisting of the beam by the governor under excessive wind velocity conditions to orient the blades in stall pitch positions, thereby preventing overspeed operation of the turbine. In the preferred embodiment, the pitch governor comprises a pendulum (65,70) which responds to changing rotor speed by pivotal movement, the limiter comprising a resilient member (90) which engages an end of the pendulum to restrict further movement thereof, and in turn restrict beam creep and unwanted blade pitch misadjustment.

9 Claims, 4 Drawing Figures

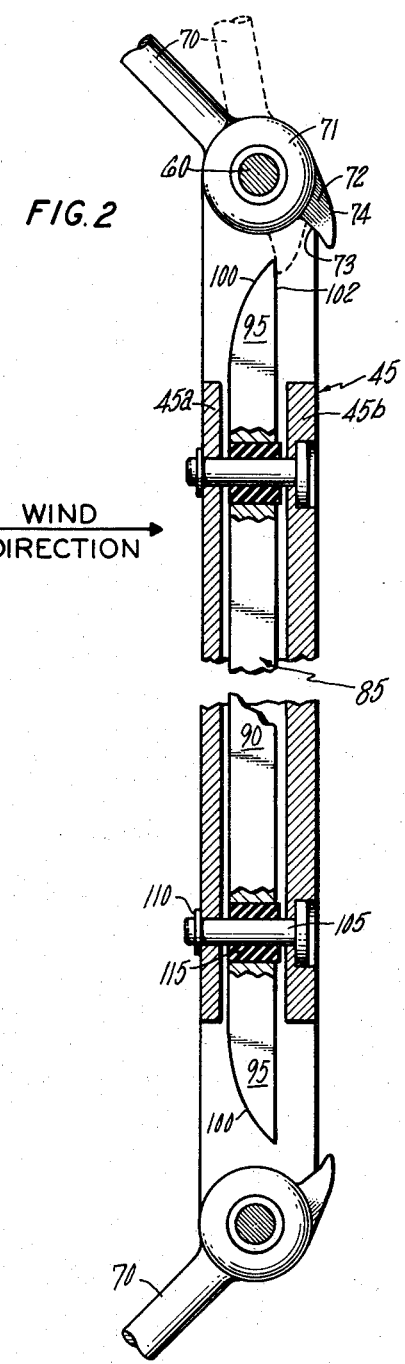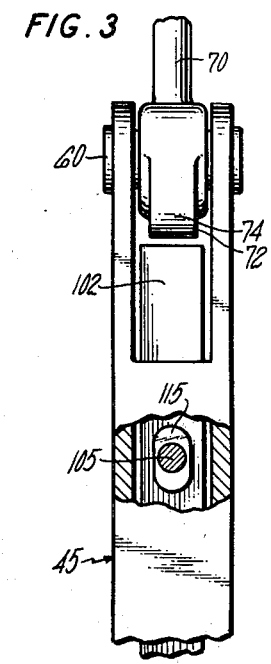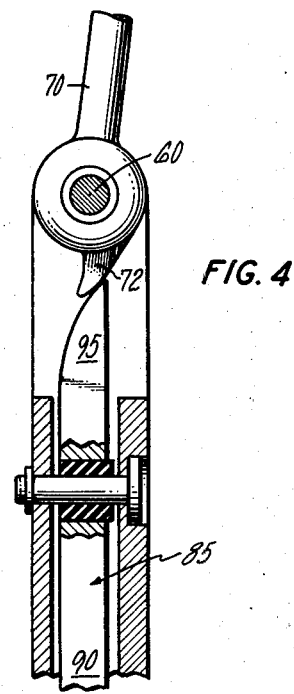

WIND TURBINE

DESCRIPTION

1. Technical Field

This invention relates to wind turbines and more specifically, wind turbines having blades, the pitch thereof being automatically adjusted by centrifugally responsive governors.

2. Background Art

Wind turbines such as that disclosed in U.S. Pat. No. 4,083,651 to Cheney, Jr. et al. employ airfoil blades which are automatically adjusted in pitch by governors in the form of pendulums responsive to the speed of rotation of the turbine rotor. The blades and pendulums of the Cheney, Jr. et al. wind turbine are so constructed that at rest, the blades are maintained in a very low (high negative) static pitch position permitting the wind turbine to self-start in response to wind of minimal velocity. As the wind velocity increaase from rest and the rotor picks up speed, the pendulums adjust the blade pitch to enhance turbine performance by maximization of the amount of wind energy capture of the blades. As disclosed in the hereinabove cited Cheney, Jr. et al. patent, for purposes of start up, the blades may be set at a pitch angle of $-30°$ while at operating speeds, the pendulums may set blade pitch at around $0°$.

In the Cheney, Jr. et al. wind turbine, the pendulums are each pivotally mounted to the wind turbine hub and operatively connected to a flexible beam to which the turbine airfoil blades are fixed. Acceleration of the wind turbine hub causes a pivoting of the pendulums in response to increased centrifugal loading, the pivoting causing the flex beam to torsionally twist, thereby adjusting blade pitch.

At any given turbine rotational speed, it is desirable to maintain blade pitch at a particular value. Deviation from this value adversely affects turbine performance by militating against optimum wind energy capture by the blades. It has been determined that the possibility of such deviation from optimum blade pitch due to creep characteristics of the flexible beam exists. That is, continuous loading of the flexible beams by the pendulums during operation of the wind turbine could, depending upon the structure and composition of the flexbeam, cause a plastic torsional deformation of that member with a resultant blade pitch deviating from optimum pitch, resulting in deteriorated turbine performance or blade stall. It has been determined that positioning the blades on the flexbeam so as to accommodate the hereinabove described creep, does not prevent further creep of the flexbeams due to loading from the pendulums and therefore would not prevent displacement of the blades from the desired pitch position.

DISCLOSURE OF THE INVENTION

It is therefore, a principal object of the present invention to eliminate in wind turbines, the adverse effects of creep on the beam on which the turbine blades are mounted.

It is another object of the present invention to eliminate such adverse effects due to creep without inimically affecting the performance of the wind turbine.

It is another object of the present invention to eliminate such adverse creep effects with an economy of structure and minimization of cost.

These and other objects, are achieved by the provision, in the wind turbine of the present invention, of a limiter which restricts continued pitch change of the turbine blades due to mounting beam creep at a predetermined rotational blade speed while allowing continuous blade pitch adjustment by pitch angle governors at excessive speeds to produce blade stalling and an attendant arrest of turbine rotation. In the preferred embodiment, the limiter comprises a flexible member which engages a corresponding blade pitch angle governor (pendulum) to restrain the pendulum at a predetermined turbine operating speed, thereby effectively limiting pendulum movement due to mounting beam creep. At excessive wind velocities, the limiter disengages the pendulum to prevent any impediment to setting the blade pitch by the pendulum at a stall condition for preventing turbine overspeed operation. Means are provided on the limiter for re-engagement with the pendulum when wind velocity is reduced to normal or near-normal operating velocity.

BRIEF DESCRIPTION OF THE DRAWINGS

FIG. 2 is a broken, partially sectioned elevation taken along the line 2—2 of FIG. 1.

FIG. 3 is a partially broken, fragmentary, side elevation of the structure shown in FIG. 2.

FIG. 4 is a view similar to that of FIG. 2 with the exception of the relative disposition of the components illustrated in this figure.

BEST MODE OF CARRYING OUT THE INVENTION

Figure 1:
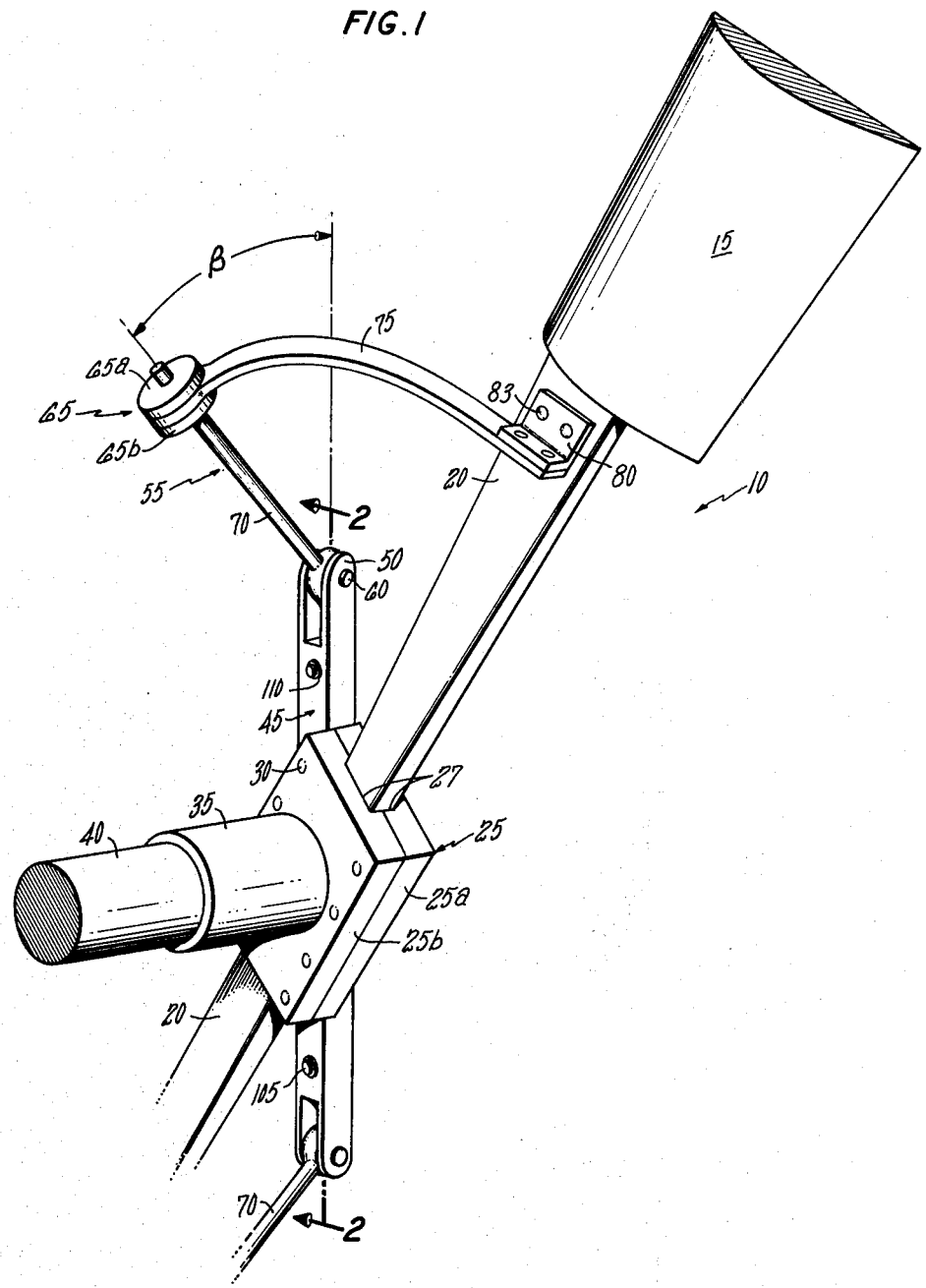
FIG. 1 is a fragmentary, isometric view of a rotor employed in a wind turbine of the type disclosed in U.S. Pat. No. 4,083,651 to Cheney, Jr. et al. but employing the present invention disclosed herein.

Referring to the drawings, a wind turbine rotor 10 somewhat similar to that disclosed in U.S. Pat. No. 4,083,651 to Cheney Jr. et al. is shown. The rotor comprises a plurality of airfoil blades, one of which is shown at 15, mounted on the end portions of flexible beam 20. While the wind turbine shown in FIG. 1, employs only a single beam and therefore, a single pair of airfoil blades, it is understood that the present invention is not limited to such a configuration, the invention being applicable with equal utiity to wind turbines having any number of blades and mounting beams. As set forth in the Cheney, Jr. et al. patent, beam 20 may be formed from any composite having suitable torsional flexibility and flexibility into and out of the plane of rotation of the blades to provide automatic pitch and yaw control in the manner described in that patent. To this end, beam 20 may be formed from such materials as composites comprising a plurality of unidirectional, high tensile strength fibers or filaments such as carbon/epoxy, fiberglass, or other well known high tensile strength fibers disposed in a matrix of suitable material such as many of various epoxy resins, the exact composition of the beams not being critical to the present invention. The flexible beam is received within hub 25 comprising halves 25a and 25b each slotted at 27 to receive the flexible beam therethrough. Halves 25a and 25b are mounted together by means of bolts 30 or other suitable fasteners and hub half 25b is attached to a collar 35 by brazing, welding, or any other suitable technique dictated at least in part by the composition of the hub. Collar 35 is received on the end of a shaft 40 which connects the wind turbine rotor to apparatus (not shown) such as an alternator powered by the wind turbine. In general, a suitable nacelle (not shown) encloses the alternator, shaft 40, and any gearing (also not shown) employed to raise the rotational speed of the rotor to a value consistent with that required by the alternator. The nacelle is typicallay mounted on a tall vertical tower (not shown) in any manner known in the art.

A pair of hollow pendulum support beams 45 are fixed to and extend radially outwardly from hub 25, these support beams being formed from any material of suitable strength and rigidity. Each beam is provided at the outer end thereof with an integral clevis 50 to which a pendulum pitch governor 55 is pivotally mounted by means of pivot (hinge) pin 60. Pendulum 55 comprises weights 65a and 65b secured to the radially outer end of pendulum rod 70. Each pendulum rod 70 is provided at the inner end therof with an enlarged end portion 71 including an outwardly extending tang 72 having forward and rear (with respect to wind direction) cam surfaces 73 and 74. As best seen in FIG. 1, one end of a strap 75 is disposed between weights 65a and 65b and the other is rigidly fixed to a bracket 80 which is in turn rigidly fixed to flexible beam 20 by rivets 83 or other suitable fastening devices or techniques. As set forth in the Cheney, Jr. et al. patent noted hereinabove, strap 75 is characterized by substantial edgewise stiffness so that the pivotal movement of pendulum 55 effects a corresponding pivoting of the strap and a torsional twisting of flexible beam 20 to adjust the pitch of blade 15 without substantial deformation of the strap.

At rest, pendulums 55 define an angle $\beta$ with the plane of rotation of the wind turbine blades, in the preferred embodiment, angle $\beta$ equalling aproximately 45° and corresponding to a blade pitch angle setting of approximately $-30°$. In operation, as described in detail in the Cheney, Jr. et al. patent, such a pitch setting provides self-starting of the wind turbine in negligible wind conditions. As wind speed increases, centrifugal force acting on pendulum 55 causes the pendulum to pivot about pin 60 toward the plane of rotation of the blades thereby decreasing angle $\beta$ and torsionally twisting flexible beam 20 to increase the pitch of the wind turbine blades. At wind speeds corresponding to turbine design operating conditions, pendulum 55 swings toward the plane of rotation of the blades sufficiently to set blade pitch at or near 0°.

It will be appreciated that normal operation of the wind turbine results in sustained loading of the flexible beam by the pendulum pitch governor, this loading being resisted by the inherent resilience of the flexible beam. As is well known, such sustained mechanical loading risks plastic deformation or creep which would be manifested in excessive torsional twisting of the flexible beam and thus, exaggerated increase in blade pitch. Creep of sufficient magnitude therefore risks substantial errors in blade pitch setting and thus, deterioration of turbine performance or perhaps stall under normal operating conditions.

To eliminate the risks of such performance deterioration due to creep of the flexible beam, the wind turbine of the present invention is provided with a limiter 85 which restricts continued blade pitch change due to torsional creep of the flexible beam at design operating wind conditions. Referring to FIGS. 2-4, limiter 85 comprises a resilient member or elongate spring bar 90 disposed within the interior of pendulum support beams 45. As best seen in FIG. 2, in the preferred embodiment, spring bar 90 is disposed between the forward and rear walls (45a and 45b respectively) of the pendulum support beams 45, clearance between the inner faces of these walls and the spring bar allowing limted longitudinal translation of the spring bar in a manner to be described in further detail hereinafter. Spring bar 90 is formed from a material such as spring steel of strength and resiliency consistent with expected loading and may be of any desired cross section, for simplicity, it being shown as generally rectangular in cross section with end portions 95 being provided on opposite sides thereof with cam follower surfaces 100 and 102. Spring bar 90 is fixed to the support beam by pins 105 retained in pendulum support beam 45 by locking clips or the like 110. The pins are received through resilient bushings 115 disposed within spaced bores provided in the spring bar.

In FIG. 2, the solid line representation of upper pendulum rod 70 including end portion 71 and tang 72 corresponds to the wind turbine at rest (no wind). In the manner described hereinabove, as wind conditions develop and turbine rotational speed increases, upper pendulum 70 pivots (clockwise in FIG. 2) toward the plane of rotation of the blades until at design wind conditions, the pendulum occupies a position shown by the dotted line representation thereof whereupon forward cam surface 73 of the tang engages the rear (flat) follower 102.

It will be understood that under such design wind conditions, beam creep would normally risk excessive torsional twisting of flexible beam 20 resulting in a deterioration in wind turbine performance. However, such excessive twisting is by the present invention, effectively restrained by end 95 of spring bar 90 for maintenance of the turbine blades at optimal pitch settings. Excessive wind velocity causing still higher rotational turbine speeds otherwise risking turbine damage, cause the pendulum members 70 to pivot further, bending the ends of spring bar 90 (to the left in FIG. 2) thus displacing the spring bar ends from the path of the tangs thereby effecting a release of the pendulum rods from the spring bar as shown in FIG. 4. Such release allows unimpeded increases in pitch effected by the pendulums, thus allowing the blades to be placed in stall conditions for arresting further rotation of the turbine rotor. Thus it will be appreciated that by the present invention, beam creep is effectively prevented without inhibiting blade stall in excessive wind velocity conditions.

So that both pendulum tangs release nearly simultaneously despite normally encountered misalignments of the wind turbine component parts, the resilient bushings 115 and the clearance between the spring bar and support beam 45 allow a limited, longitudinally translational displacement of the spring bar within the support beam. Thus, in addition to the bending of spring bar ends 95, upon release from one of the tangs, the spring bar translates away from the other (still engaged) tang thereby enhancing its release from that other tang. The enhanced (accelerated) release of the spring bar and from the other pendulum tang causes the spring bar ends to release nearly simultaneously from the pendulums despite slight misalignment of component parts.

Referring to FIG. 4, and assuming that from blade stall conditions, wind velocity has decreased, causing rotational speed to decrease to a value below design speed, flexible beams 20 will relax, causing a pivoting of the pendulum pitch governors in a direction away from the plane of rotation of the blades thereby re-engaging the tangs 72 at the rear surfaces 74 thereof with follower surfaces 100 of spring bar ends 95. This relaxation of flexible beam 20 pivots upper pendulum 70 (and tang 72) so as to bend the upper spring bar end out of the path of the tang thereby releasing the spring bar from the pendulum for effecting a return of the pendulum to the opposite side of the spring bar. This once again places the wind turbine blades at negative pitch positions for self-starting and optimal performance of the wind turbine.

Accordingly, it is seen that the wind turbine of the present invention provides effective control of beam creep without relinquishing the automatic stall of the turbine blades in conditions of excessively high wind velocity and turbine rotational speed. It will be appreciated that the functions provided by the limiter in this wind turbine are achieved with an economy of structure and therefore, minimization of cost. The clearances between the spring bar and support beams, and the flexible mounting of the limiter assure that any component misalignment does not adversely affect the simultaniety of the release of the spring bar ends.

I claim

1. In a wind turbine comprising a rotatable hub, at least one torsionally flexible beam including portions extending outwardly of said hub for rotation therewith, an airfoil blade fixed to each said outwardly extending beam portion for rotation therewith and a governor connected to each said beam portion, said governor being responsive to rotor speed by movement along a predetermined path for torsionally twisting said beam portion, thereby adjusting the pitch of said blade from a position corresponding to low pitch at static or negligible wind velocity conditions for turbine self-starting to a position of increased pitch for increasing the speed of rotation of said wind turbine with increasing wind speed, the improvement characterized by:

means carried by said hub and engaging said governor thereby limiting the movement thereof for restricting continued pitch change of said blade at a predetermined turbine operating speed due to torsional creep of that flexible beam to which said blade is fixed, and being released from said governor for allowing continued torsional twisting of said beam to orient said blade in a stall position at excessive turbine speeds for preventing further overspeed operation of said wind turbine.

2. The wind turbine of claim 1 further characterized by said governor comprising a pendulum, operatively connected to said flexible beam and responsive to variations in rotor speed by pivotal movement with respect to said hub, said means being engageable with a portion of said pendulum for restricting movement thereof to effect said restriction in blade pitch change due to torsional creep of said flexible beam.

3. The wind turbine of claim 2 further characterized by said means comprising a resilient member.

4. The wind turbine of claim 3 further characterized by said resilient member comprising an elongate spring bar.

5. The wind turbine of claim 4 further characterized by said spring bar at an end portion thereof including opposite sides engageable by said pendulum, said pendulum engaging said spring bar end portion at one side thereof at said turbine operating speed, continued pivoting of said pendulum in response to said excessive turbine speed causing a bending of said spring bar, thereby displacing said spring bar end portion and effecting release of said spring bar from said pendulum and disposition of said pendulum adjacent an opposite side of said spring bar end portion of orienting said blade in said stall pitch position, said pendulum being engageable with said spring bar end portion at said opposite side thereof under conditions of reduced turbine speed subsequent to release of said spring bar from said pendulum at said excessive turbine speed, torsional loading of said pendulum by said flexible beam driving said pendulum in a reverse direction, causing said pendulum to bend said spring bar end portion out of the way of said pendulum for effecting a return of said pendulum to said one side of said spring bar end portion.

6. The wind turbine of claim 5 further characterized by said pendulum being provided with a cam surface on one end thereof, and said one side of said corresponding spring bar end portion comprising a follower surface, displacement of said spring bar end being effected by a camming of said spring bar end portion by said pendulum cam surface at said follower surface.

7. The wind turbine of claim 6 further characterized by said cam surface being provided on a tang extending radially inwardly from an inner end of said pendulum.

8. The wind turbine of claim 7 further characterized by said spring bar including multiple end portions each engageable with one pendulum and being movable with respect to said hub such that the release of one of said spring bar end portions from a corresponding one of said pendulums causes said spring bar to translate in a direction causing the release of said spring bar at another end portion thereof from another of said pendulums.

9. The wind turbine of claim 8 further characterized by a pair of spaced resilient mounts carried by said hub, said spring bar being fixed to said mounts at locations spaced from one another along the longitudinal axis of said spring bar, differential flexure of said mounts providing said translation of said spring bar with respect to said hub.

* * * * *